(12) United States Patent
Zhang et al.

(10) Patent No.: US 8,411,754 B2
(45) Date of Patent: Apr. 2, 2013

(54) SYSTEM, METHOD, AND COMPUTER PROGRAM PRODUCT FOR TRANSLATING AN ELEMENT OF A STATIC ENCODED IMAGE IN THE ENCODED DOMAIN

(75) Inventors: Dengzhi Zhang, San Jose, CA (US); Charles Lawrence, Fremont, CA (US)

(73) Assignee: ActiveVideo Networks, Inc., San Jose, CA (US)

( * ) Notice: Subject to any disclaimer, the term of this patent is extended or adjusted under 35 U.S.C. 154(b) by 1178 days.

(21) Appl. No.: 12/268,049

(22) Filed: Nov. 10, 2008

(65) Prior Publication Data

US 2010/0118972 A1   May 13, 2010

(51) Int. Cl.
*H04N 7/12* (2006.01)

(52) U.S. Cl. ......... 375/240.24; 375/240.17; 375/240.25; 375/240.26

(58) Field of Classification Search ................ None
See application file for complete search history.

(56) References Cited

U.S. PATENT DOCUMENTS

| | | | | |
|---|---|---|---|---|
| 7,212,573 B2* | 5/2007 | Winger | ................ | 375/240.12 |
| 7,346,111 B2* | 3/2008 | Winger et al. | ............ | 375/240.24 |
| 7,623,575 B2* | 11/2009 | Winger | ................ | 375/240.17 |
| 8,036,271 B2* | 10/2011 | Winger et al. | ............ | 375/240.16 |
| 8,155,194 B2* | 4/2012 | Winger et al. | ............ | 375/240.16 |
| 8,170,107 B2* | 5/2012 | Winger | ................ | 375/240.16 |
| 2008/0052742 A1 | 2/2008 | Kopf et al. | ................ | 725/34 |
| 2008/0084503 A1 | 4/2008 | Kondo | ................ | 348/556 |
| 2008/0170619 A1 | 7/2008 | Landau | ................ | 375/240.16 |
| 2010/0166071 A1* | 7/2010 | Wu et al. | ................ | 375/240.16 |

OTHER PUBLICATIONS http://www.activevideo.com/, as printed out in year 2012.*
Authorized Officer: Park, Sangcheol International Search Report and Written Opinion, PCT/US2009/06471; Jun. 15, 2010.

* cited by examiner

*Primary Examiner* — David Y Jung
(74) *Attorney, Agent, or Firm* — Sunstein Kann Murphy & Timbers LLP

(57) ABSTRACT

A computer-implemented method for creating in the encoded domain one or more video frames from a compressed still video image wherein image content in the created video frames is translated in location by panning or scrolling or a combination thereof on a non-block basis (i.e. pixel-level). A new block formed from portions of two other blocks is created by processing the original two blocks with identity matrices based upon the shift amount. By performing the creation process in the encoded domain processing power requirements are reduced and image quality is increased.

20 Claims, 8 Drawing Sheets

SYSTEM, METHOD, AND COMPUTER PROGRAM PRODUCT FOR TRANSLATING AN ELEMENT OF A STATIC ENCODED IMAGE IN THE ENCODED DOMAIN

TECHNICAL FIELD

The present invention relates to encoding video images and more specifically to encoding a sequence of video images wherein a portion of a first video image moves between images.

BACKGROUND ART

Digital video that is transmitted through a network, such as the Internet or a cable television system is generally compressed. Compression is desirable because of the limited bandwidth of most transmission channels (e.g. cable, DSL, cellular etc.). In general, spatial compression algorithms include at least three steps for encoding: transform coding, quantization, and entropy encoding.

In a compressed digital video environment, such as those that transmit and display MPEG encoded video content, still images may be presented to an end user, wherein the still images are repeatedly displayed as video. In a cable television environment wherein all information is transmitted as an MPEG video stream, the presentation of still images may be useful when a selection screen or a static webpage is provided to a cable television subscriber.

It is known in the prior art to have scrolling content such as a ticker for display of stock quotes at the bottom of a static image. The image onto which the ticker is placed will be referred to herein as the base image. In order to create a ticker in an encoded video environment, the base image must first be decoded to the spatial domain and then repeatedly re-encoded with the ticker at different positions. In other words, for each frame of video, the static image is re-encoded with the ticker repositioned, so that upon playback the ticker appears to move across the screen.

The decoding of the encoded image data requires substantial processing power, especially when transform decoding of the image. Because of the processing demands in decoding and re-encoding the image data, tickers and other translating data are not provided in a real-time encoded video environment wherein there are many subscribers. In addition to being processor intensive, the decoding and re-encoding of video content degrades the final image that is presented to the subscriber.

SUMMARY OF THE INVENTION

The present methodology, system, and computer program product provides for the calculation of block data in the encoded domain wherein visual material is translated over a series of video frames and the shifts between frames of a block of data are not on block boundaries, but rather are pixel-level shifts. One embodiment of the present invention discloses a computer implemented method for determining encoded block data of a macroblock for a new image in an elementary stream based upon two or more blocks where at least one block originates from a still encoded image. First, the still image is received by a processor. A pixel shift associated with one or more blocks within the still encoded image is obtained. The pixel shift may be predetermined or input by a user in response to a prompt. Encoded block data for the two or more blocks that form a new block in the new image are obtained. One or more encoded identity matrixes are retrieved from memory based upon the pixel shift value. The new encoded block data is calculated based upon the retrieved one or more identity matrixes and the encoded block data for the two or more blocks. Thus, a matrix multiplication and summation is performed using the block data and identity matrixes. The encoded block data may originate from the encoded still image or may originate from new encoded content. Thus, the new block data that is determined for the purpose of creating a new image with an image element. The new encoded data may move across a viewable display when decoded wherein the new encoded data replaces data from the encoded still image.

Once the new block data is determined, the new encoded block data replaces data within the encoded still image. As a result, the new encoded block data replaces encoded still image data that resides at the same location in the spatial domain. The process may be repeatedly performed to create a video stream, so that upon decoding and display of the sequence of created video frames, spatial domain data will appear to translate across the display. The video stream may be formatted into an elementary stream, such as an MPEG elementary stream. When each video frame is created the blocks that contain new shifted block data are calculated in the encoded domain using an encoded identity matrix and this new encoded data is combined with the data of the still image (i.e., are not translated). Thus, the blocks of the still image that do not change between frames may be encoded to reflect their static nature. In an MPEG-encoded video stream, the repetition of block data between frames can be accommodated by repeating the static encoded data in each frame or temporally encoding the data using standard MPEG techniques, such as zero motion vectors.

The invention may be embodied as a computer program product for use on a computer system wherein the computer program product has computer code thereon for determining new encoded block data from two or more encoded blocks originating from a still video image and/or new data where the new encoded block data results from a spatial translation of either a portion of the still video image or the translation of the spatial representation of the new data across the still video image. The invention as embodied can determine in the encoded domain block encoded data values wherein movement between frames is not on a block or macroblock basis, but the translation is at the pixel level. The computer program may automatically create a series of video frames based upon the still image and the new data so as to represent the translation. Additionally, the path along which the new data will move should be provided. The path may be simply a horizontal or vertical scroll or a more sophisticated path. The computer program product may produce an MPEG elementary stream. In creating each new encoded video frame, the macroblocks that contain translated data will be calculated and the data from the still video image can be reused. Thus, motion vectors can be created for the still video image data that is not in a block or macroblock that has translated material (e.g. MPEG B or P frames) or the encoded block data can be repeated (e.g. MPEG I frames).

In the spatial domain, the new encoded block data contains spatial image elements from at least two shifted blocks (a first block and a second block). The shifted blocks may be blocks that have been shifted by a number of pixels within the still video image or a combination of new material with the still video image. The new encoded block data is created by multiplying a first identity matrix by the transform encoded data from the first block forming a first data set wherein the first identity matrix has a dimensional property proportional to the first portion of the spatial image element. A second identity matrix is multiplied by the transform encoded data from the second block forming a second data set wherein the second identity matrix has a dimensional property proportional to the second portion of the spatial image element. The first and second calculated data sets are used to form a new transform encoded block data set. The new transform encoded block data set is stored in a memory. The new transform encoded block data set may be quantized and entropy encoded. Once the new transform encoded block data set is entropy encoded, it may be placed at a predetermined location within an MPEG frame data set and used as part of an MPEG encoded elementary stream. Thus, the encoding of translating element with a static encoded image can be performed substantially in the encoded domain.

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS

The following definitions shall have the meaning provided unless the context indicates otherwise. The term "translation" shall mean the repositioning of image content within a series of video frames to be temporally displayed, so as to simulate movement of the image content. For example, text scrolling and tick displaying are forms of translation of image content. The term "encoded" shall mean that image data has been at least partially passed through a compression process. Spatial compression generally requires that data is transform coded, quantized, and entropy encoded. Pixel data that is passed through a spatial transform, such as the discrete cosine transform (DCT) to create transform data, but that has not been quantized or entropy encoded will still be considered encoded. The term "image" and "frame" shall have the same meaning unless the context indicates otherwise. Both terms shall apply to fields as is understood in the art.

The present invention in one embodiment is directed to a computer-implemented method for creating in the encoded domain one or more blocks in the encoded domain composed from at least two partial blocks that are also encoded. The methodology can be expanded to allow for calculation of one or more new video frames based on an encoded still video image wherein new image content in the created video frames is translated in location from the still frame by panning or scrolling or a combination thereof on a non-block basis (i.e. pixel-level shifts as opposed to block and macroblock shifts). By performing the creation process in the encoded domain, processing power requirements are reduced and image quality is increased in comparison to decoding an encoded image to the spatial domain, performing the translation, and re-encoding the image for each subsequent frame. The process of creating a sequence of images in the encoded domain wherein image content is translated between images can be used to add an object composed of one or more data blocks (e.g. 8×8 pixels), and more specifically, an object that changes between frames to an encoded still video image wherein the object may move along a path, but moves on a non-block boundary basis (pixel-level shifts). The path of movement may be linear or non-linear.

Figure 1A:
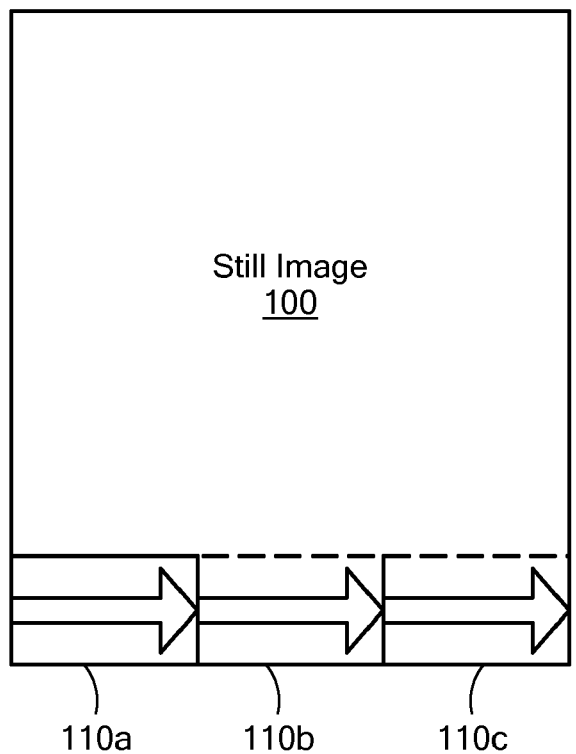
FIGS. 1A and 1B show representative screen views of still images that include horizontal and vertical moving content.
Figure 1B:
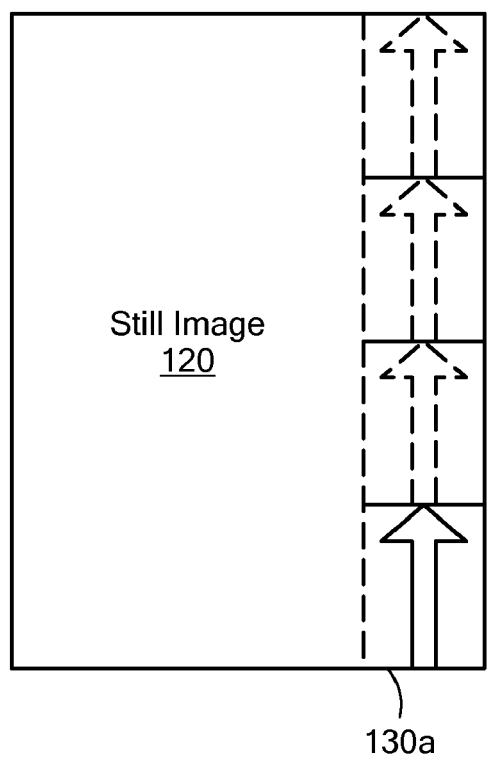

FIG. 1A shows representative screen view of an image in the spatial domain. The image includes a base section 100 and a translation section 110A. The video image will be presented to an end user through the display of a set of video frames that are temporally displayed. As the video frames are displayed, the base section 100 of the image remains substantially static, while the translation section moves 110A, 110B, 110C. As shown, spatial content enters from the left within the translation section 110A and displaces content in the original still image by a number of pixels. Thus, content which is located at one pixel location in a first video frame is located at a different pixel location in a subsequent frame. FIG. 1B shows a representative screen view of an image having a base section 120 and a translation section 130A. In this example, the translation section 130A, translates vertically between frames providing the effect of movement between the bottom and top of a display or the top and bottom of the display when the frames are sequentially displayed. The new content appears to be moving from outside of the display window.

For the remainder of this description, MPEG encoding will be presumed to be the implemented encoding scheme, although other compression algorithms may be employed that spatially subdivide pixel data prior to encoding. As should be understood by one of ordinary skill in the art, when a block or macroblock of pixels is transformed into the encoded/frequency domain an equal number of coefficient values result. Thus, there is a one to one correspondence between pixels in the spatial domain and coefficients in the encoded domain. As a result, blocks and macroblocks can reference either spatial pixel values/locations or frequency-based coefficient values.

Figure 2:
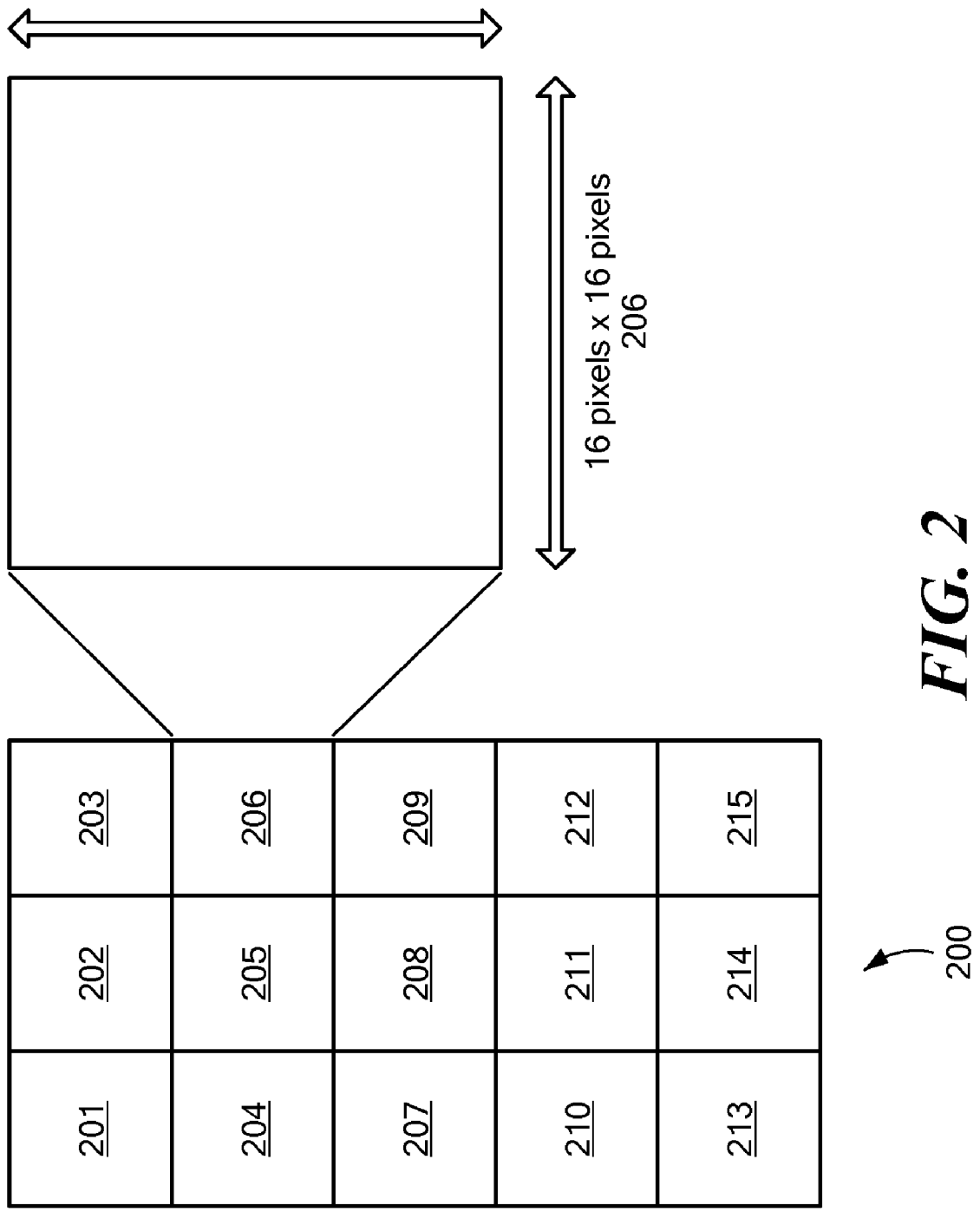
FIG. 2 shows a representative image subdivided into macroblocks with an enlarged representative block from the macroblock.

FIG. 2 shows a representative spatial image 200 subdivided into macroblocks 201-215 with a block 240 within macroblock 206 being enlarged. The designations of macroblocks 201-215 reference the position of the macroblock and not necessarily the data contained within the macroblock. Thus, when referencing a new video frame, the new video frame may have a macroblock numbered 203.

The spatial image shown in FIG. 2 is 3 macroblocks wide by 5 macroblocks high. Each macroblock includes 16×16 pixel values which may be represented by 4 8×8 pixel blocks as shown with respect to macroblock 206. In the 4:2:0 color space, a macroblock includes 6 blocks: 4 for luminance and 1 for each of the color differences. As used herein, the term block shall refer to a grouping of proximate pixel values in either the pixel or encoded domain and the term may encompass sizes other than 8×8 pixels.

The spatial information as represented by the encoded block coefficient values may be translated in position by creating a series of one or more new images wherein new encoded macroblock coefficient data is calculated in the encoded domain. The translation between subsequent image frames occurs pixelwise (i.e. arbitrary position). Since the translation in location is not on a block basis, the pixel information and the corresponding encoded coefficients do not originate in a single block and thus, the coefficient data within macroblocks in which movement has occurred needs to be calculated. For example, new information may scroll across a screen from left to right in the spatial domain. Thus, the first macroblock on the left side of the screen, such as macroblock 213 in FIG. 2 for a new frame has a combination of new pixel information and old pixel information from a previous frame. The coefficient values for macroblock 213 can be calculated in the encoded domain using the technique described below. The process disclosed herein may be combined with motion vector calculations for creating the data representing a new frame of video. Motion vectors may be calculated on a macroblock by macroblock basis for macroblock data for a new frame from macroblock data that existed in a previous frame. Thus, motion vector data may be calculated for macroblocks 214 and 215 from FIG. 2 in a new video frame, since the data that will make up macroblocks 214 and 215 in the new video frame originated in macroblocks 213, 214, and 215 from the previous video frame. However, the techniques described below would be needed for calculating all of the data within macroblock 213 for the new video frame, since macroblock 213 in the new video frame will contain one or more blocks that have new content and also content from macroblock 213 from the previous frame. Since motion vectors can only be designated on a macroblock basis and not on a block basis and even though all the data from some blocks may have existed in the previous video frame, the entire new macroblock 213 for the new video frame must be calculated in the encoded domain using the methodology described below.

Figure 3A:
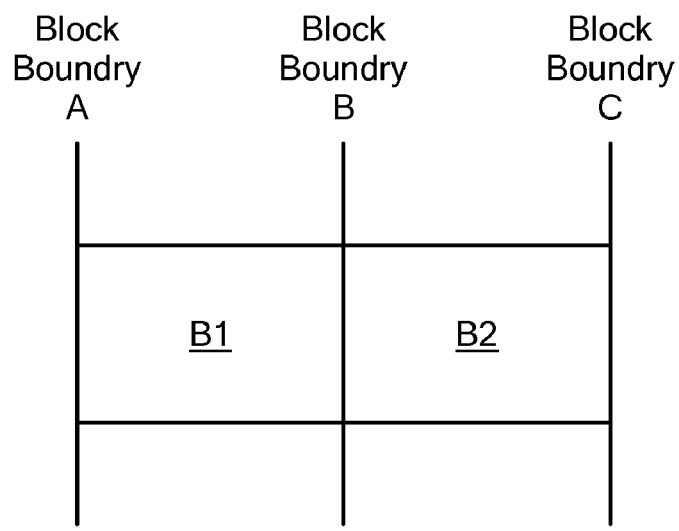
FIG. 3A shows two blocks from a video frame that will be translated horizontally by a predefined number of pixels in a subsequent video frame.
Figure 3B:
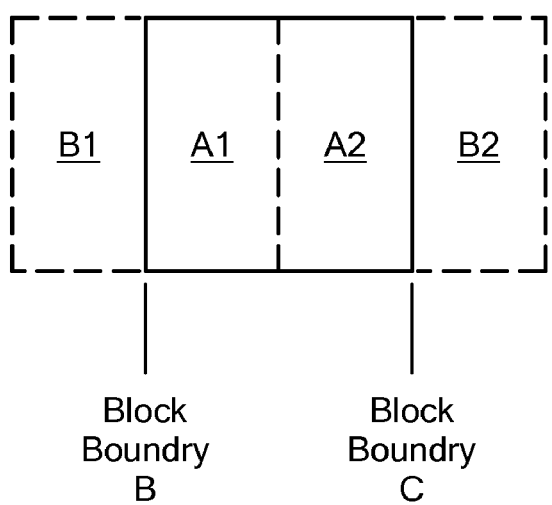
FIG. 3B shows a new block created from the two blocks in FIG. 3A.

FIG. 3A shows in the spatial domain two blocks from a video frame to be translated in a subsequent frame. The first block is designated B1 while the second block is designated B2. The blocks lie on block boundaries wherein block B1 lies between block boundaries A and B and block B2 lies between block boundaries B and C. The blocks are shifted in position by a number of pixels to the right in a subsequently created frame as shown in FIG. 3B. A new block is defined between block boundaries B and C that contains a portion of block B1 (Section A1) and a portion of block B2 (Section A2). Thus, original blocks B1 and B2 that previously resided on block boundary are no longer on block boundaries and thus, each block within the row or portion of a row where there is shift must be recalculated. The present description describes the calculation of a single block, however as already stated this process could be performed for each block that contains shifted information from two blocks in each new frame within the sequence of frames. Additionally, the process may be restricted to calculating the blocks within a macroblock that contain new information that was not present within the macroblock in a previous frame. For example, in a ticker, the new information that was off screen that enters a macroblock within the visual display in a subsequent frame would be calculated. In such an embodiment, motion vectors could be determined for each macroblock for a new frame in which the encoded data was present in a macroblock in the previous frame.

Figure 3C:
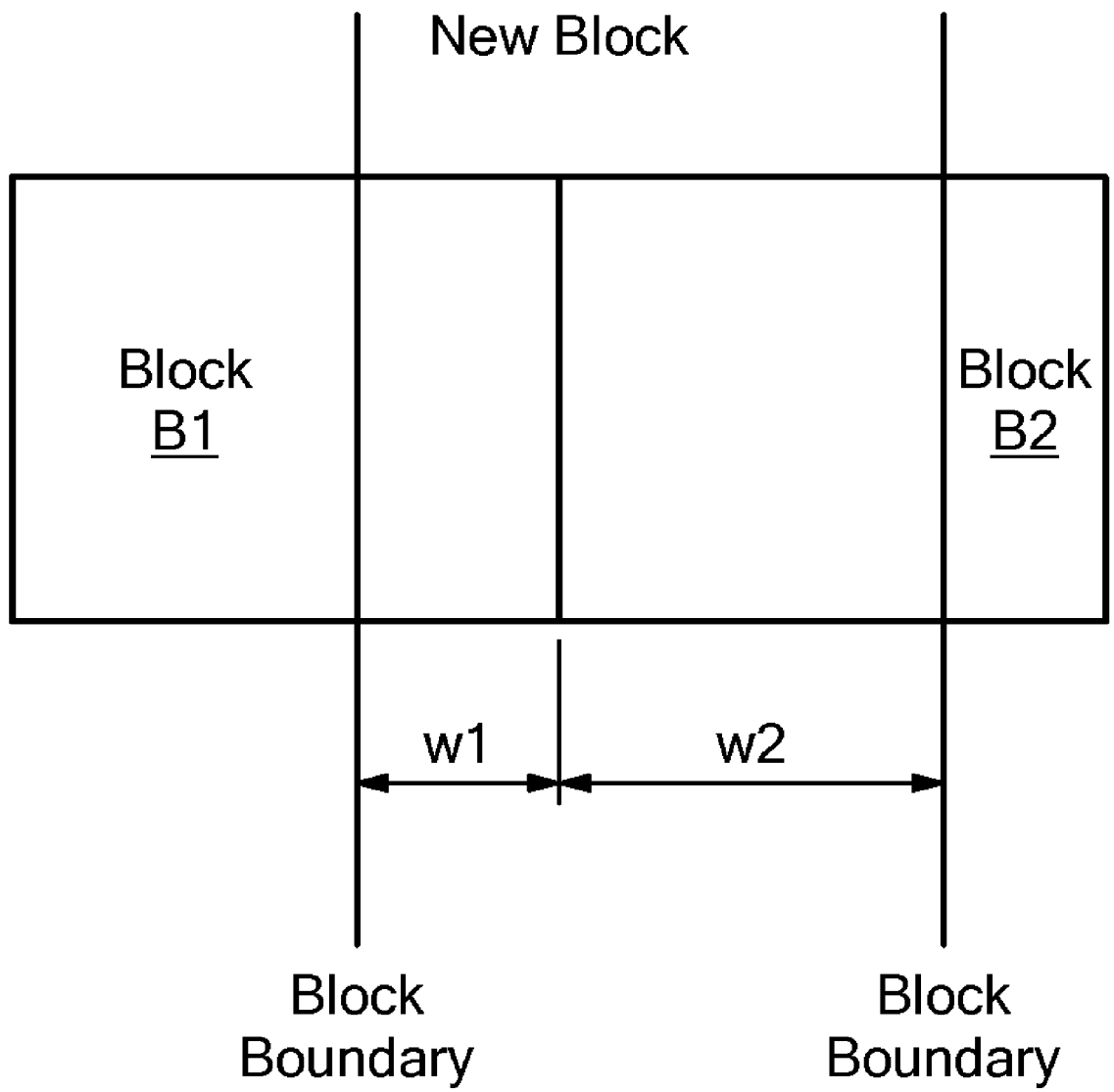
FIG. 3C shows that sections $A_1$ and $A_2$ from FIG. 3B each have an associated width wherein the total width W=w1+w2 and W=8 which is the number of pixels within a block from a macroblock.

FIG. 3C shows that sections $A_1$ and $A_2$ from FIG. 3B each have an associated width wherein the total width W=w1+w2 and W=8 which is the number of pixels within a block from a macroblock. Thus, the new block A for a new encoded image is composed of sections $A_1$ and $A_2$.

In the pixel domain, $$A = A_1 + A_2$$

$$A_1 = B_1 H_1, \text{where } H_1 = \begin{bmatrix} 0 & 0 \\ I_{w1} & 0 \end{bmatrix}, I_{w1} \text{ is identity matrix with size } w1 \times w1$$

$$A_2 = B_2 H_2, \text{where } H_2 = \begin{bmatrix} 0 & I_{w2} \\ 0 & 0 \end{bmatrix}, I_{w2} \text{ is identity matrix with size } w2 \times w2$$

$$A = B_1 H_1 + B_2 H_2$$

In the DCT domain, $$DCT(A) = DCT(A_1) + DCT(A_2)$$

$$= \sum_{i=1}^{2} DCT(B_i) DCT(H_i)$$

As a result, a processor can calculate the encoded coefficients for block A in the encoded domain. The DCT of H1 and H2 can be pre-computed and stored in memory associated with the processor to reduce the number of computations. For each combination of w1 and w2 there would be a separate DCT encoded H1 and H2 pair (e.g. [1,8], [2,7], [3,6] . . . [8,1]).

As an example H1 and H2 are provided below where section A1 contains 2 pixels from B1 and thus w1=2 and section A2 contains 6 pixels from B2 and thus w2=6. Additionally, the calculation of the encoded version of H1 is also provided for exemplary purposes.

$$w1 = 2 \text{ and } w2 = 6,$$

$$H_1 = \begin{bmatrix} 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 1 & 0 & 0 & 0 & 0 & 0 & 0 & 0 \\ 0 & 1 & 0 & 0 & 0 & 0 & 0 & 0 \end{bmatrix},$$

$$H_2 = \begin{bmatrix} 0 & 0 & 1 & 0 & 0 & 0 & 0 & 0 \\ 0 & 0 & 0 & 1 & 0 & 0 & 0 & 0 \\ 0 & 0 & 0 & 0 & 1 & 0 & 0 & 0 \\ 0 & 0 & 0 & 0 & 0 & 1 & 0 & 0 \\ 0 & 0 & 0 & 0 & 0 & 0 & 1 & 0 \\ 0 & 0 & 0 & 0 & 0 & 0 & 0 & 1 \\ 0 & 0 & 0 & 0 & 0 & 0 & 0 & 0 \\ 0 & 0 & 0 & 0 & 0 & 0 & 0 & 0 \end{bmatrix},$$

$$DCT(H_1) = B H_1 B^T$$

where $$B = \frac{1}{2} \times \begin{bmatrix} a & a & a & a & a & a & a & a \\ b & c & d & e & -e & -d & -c & -b \\ f & g & -g & -f & -f & -g & g & f \\ c & -e & -b & -d & d & b & e & -c \\ c & -e & -b & -d & d & b & e & -c \\ d & -b & e & c & -c & -e & b & -d \\ g & -f & f & -g & -g & f & -f & g \\ e & -d & c & -b & b & -c & d & -e \end{bmatrix}$$

$$= \begin{bmatrix} .3536 & .3536 & .3536 & .3536 & .3536 & .3536 & .3536 & .3536 \\ .4904 & .4157 & .2778 & .0975 & -.0975 & -.2778 & -.4157 & -.4904 \\ .4619 & .1913 & -.1913 & -.4619 & -.4619 & -.1913 & .1913 & 4619 \\ .4157 & -.0975 & -.4904 & -.2778 & .2778 & .4904 & .0975 & -.4157 \\ .3536 & -.3536 & -.3536 & .3536 & .3536 & -.3536 & -.3536 & .3536 \\ .2778 & -.4904 & .0975 & .4157 & -.4157 & -.0975 & .4904 & -.2778 \\ .1913 & -.4619 & .4619 & -.1913 & -.1913 & .4619 & -.4619 & .1913 \\ .0975 & -.2778 & .4157 & -.4904 & .4904 & -.4157 & .2778 & -.0975 \end{bmatrix}$$

$$a = \frac{1}{\sqrt{2}},$$

$$b = \cos\frac{\pi}{16},\ c = \cos\frac{3\pi}{16},\ d = \cos\frac{5\pi}{16},\ e = \cos\frac{7\pi}{16},$$

$$f = \cos\frac{\pi}{8},\ g = \cos\frac{3\pi}{8}$$

In the DCT domain, $$DCT(H_1) = \begin{bmatrix} .3536 & .3536 & .3536 & .3536 & .3536 & .3536 & .3536 & .3536 \\ .4904 & .4157 & .2778 & .0975 & -.0975 & -.2778 & -.4157 & -.4904 \\ .4619 & .1913 & -.1913 & -.4619 & -.4619 & -.1913 & .1913 & .4619 \\ .4157 & -.0975 & -.4904 & -.2778 & .2778 & .4904 & .0975 & -.4157 \\ .3536 & -.3536 & -.3536 & .3536 & .3536 & -.3536 & -.3536 & .3536 \\ .2778 & -.4904 & .0975 & .4157 & -.4157 & -.0975 & .4904 & -.2778 \\ .1913 & -.4619 & .4619 & -.1913 & -.1913 & .4619 & -.4619 & .1913 \\ .0975 & -.2778 & .4157 & -.4904 & .4904 & -.4157 & .2778 & -.0975 \end{bmatrix} \times$$

-continued $$\begin{bmatrix} 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 1 & 0 & 0 & 0 & 0 & 0 & 0 & 0 \\ 0 & 1 & 0 & 0 & 0 & 0 & 0 & 0 \end{bmatrix} \times \begin{bmatrix} .3536 & .4904 & .4619 & .4157 & .3536 & .2778 & .1913 & .0975 \\ .3536 & .4157 & .1913 & -.0975 & -.3536 & -.4904 & -.4619 & -.2778 \\ .3536 & .2778 & -.1913 & -.4904 & -.3536 & -.0975 & .4619 & .4157 \\ .3536 & .0975 & -.4619 & -.2778 & .3536 & .4157 & -.1913 & -.4904 \\ .3536 & -.0975 & -.4619 & .2778 & .3536 & -.4157 & -.1913 & .4904 \\ .3536 & -.2778 & -.1913 & .4904 & -.3536 & -.0975 & .4619 & -.4157 \\ .3536 & -.4157 & .1913 & .0975 & -.3536 & .4904 & -.4619 & .2778 \\ .3536 & -.4904 & .4619 & -.4157 & .3536 & -.2778 & .1913 & -.0975 \end{bmatrix}$$

where $DCT(H1) =$ $$\begin{bmatrix} 0.2501 & 0.3204 & 0.2310 & 0.1125 & 0.0000 & -0.0752 & -0.0957 & -0.0638 \\ -0.3204 & -0.4077 & -0.2858 & -0.1250 & 0.0264 & 0.1250 & 0.1470 & 0.0957 \\ 0.2310 & 0.2858 & 0.1767 & 0.0345 & -0.0957 & -0.1734 & -0.1768 & -0.1097 \\ -0.1125 & -0.1250 & -0.0345 & 0.0811 & 0.1815 & 0.2309 & 0.2107 & 0.1250 \\ 0.0000 & -0.0264 & -0.0957 & -0.1815 & -0.2501 & -0.2716 & -0.2310 & -0.1327 \\ 0.0752 & 0.1250 & 0.1734 & 0.2309 & 0.2716 & 0.2725 & 0.2221 & 0.1250 \\ -0.0957 & -0.1470 & -0.1768 & -0.2107 & -0.2310 & -0.2221 & -0.1767 & -0.0982 \\ 0.0638 & 0.0957 & 0.1097 & 0.1250 & 0.1327 & 0.1250 & 0.0982 & 0.0542 \end{bmatrix}$$

As provided above the DCT for $H_1$ can be pre-calculated and stored in memory for retrieval by the processor. Similarly, the DCT for $H_2$ can also be precalculated. As previously stated, this combination of DCT $H_1$ where $w_1=2$ and DCT $H_2$ where $w_2=6$ may be used to determine the DCT encoded coefficients for macroblock A. Thus, the calculation for each block in a subsequent video image that has shifted by the same number of pixels would use the same $H_1$ and $H_2$ identity matrixes. Similarly, the DCT of all combinations of $H_1$ and $H_2$ can be precalculated and used for other shift combinations of pixels within a block ($[w_1=1, w_2=8], [w_1=2, w_2=7]$, etc.). The identity matrices may be stored in memory in the encoded domain or non-encoded domain.

Figure 4A:
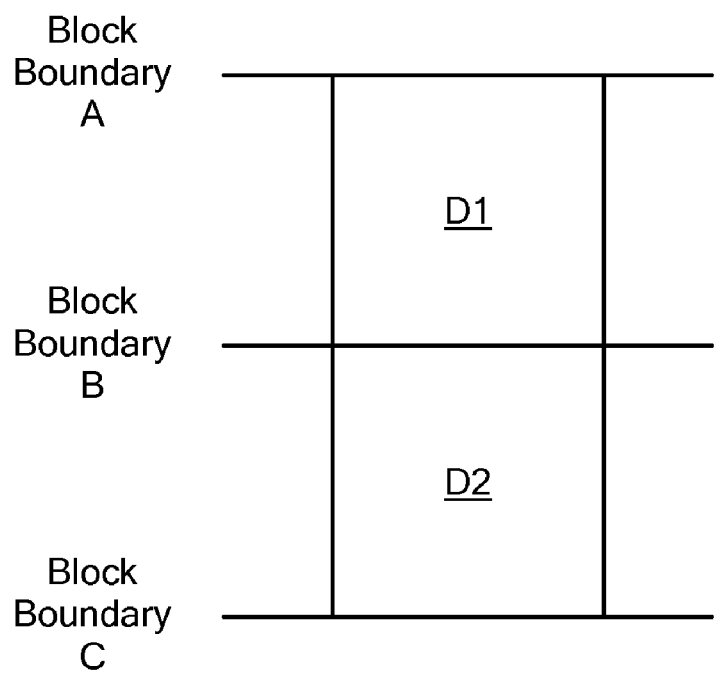
FIG. 4A shows two blocks that are vertically aligned from a video frame that will be translated vertically by a predefined number of pixels.
Figure 4B:
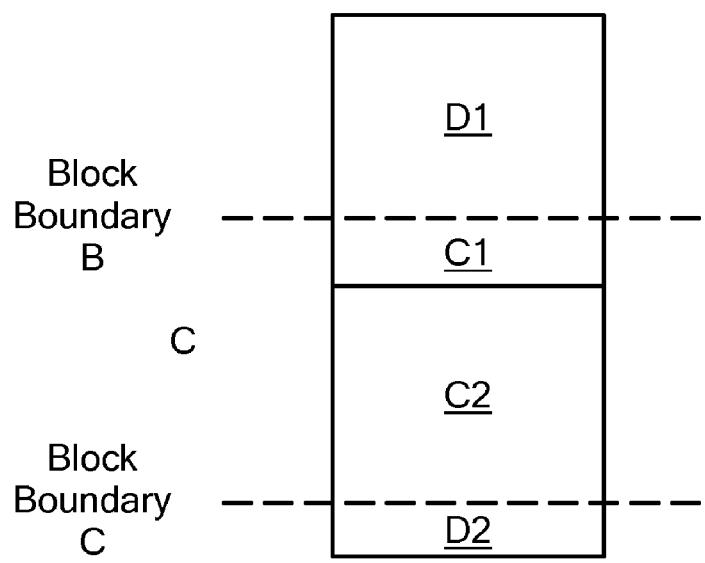
FIG. 4B shows a new block created from the two blocks in FIG. 4A.

FIG. 4A shows two exemplary blocks arranged vertically. Blocks D1 and D2 reside within block boundaries A, B, and C. Block D1 originally lies between block boundaries A and B and Block D2 lies between block boundaries B and C. In one embodiment, the content in block D1 is from a still image, wherein the data of the image is intracoded data. The content in block D2 is new content that will be added into the still image and which causes the block D1 to be displaced by a number of pixels. For example, at time T=0, block D1 may be the block at the lowest point on the display screen and block D2 is off screen. FIG. 4B shows blocks D1 and D2 and time T=1. Blocks D1 and D2 have shifted by a number of pixels. Thus, a portion of Block D2 (i.e. C2) resides between block boundaries B and C along with a portion of Block D1 (i.e. C1). As expressed in the exemplary embodiment above, block boundaries B and C lay at the bottom of the display. Thus, Block C in the spatial domain is composed of data from Blocks D1 and D2.

The equations for determining the encoded data in the encoded domain for this vertical movement are similar to that for horizontal movement and are provided below.

In the pixel domain $$C = C_1 + C_2$$

$C_1 = H_1 D_1$, where $$H_1 = \begin{bmatrix} 0 & I_{h1} \\ 0 & 0 \end{bmatrix},$$

$I_{h1}$ is identity matrix with size h1×h1.
$C_2 = H_2 D_2$, where $$H_2 = \begin{bmatrix} 0 & 0 \\ I_{h2} & 0 \end{bmatrix},$$

$I_{h2}$ is identity matrix with size h2×h2.

$$C = H_1 D_1 + H_2 D_2$$

In the DCT domain $$DCT(C) = DCT(C_1) + DCT(C_2)$$

$$DCT(C_i) = DCT(H_i)DCT(D_i), \text{ where } i=1,2.$$

$$DCT(C) = \sum_{i=1}^{2} DCT(H_i)DCT(D_i)$$

Figure 5:
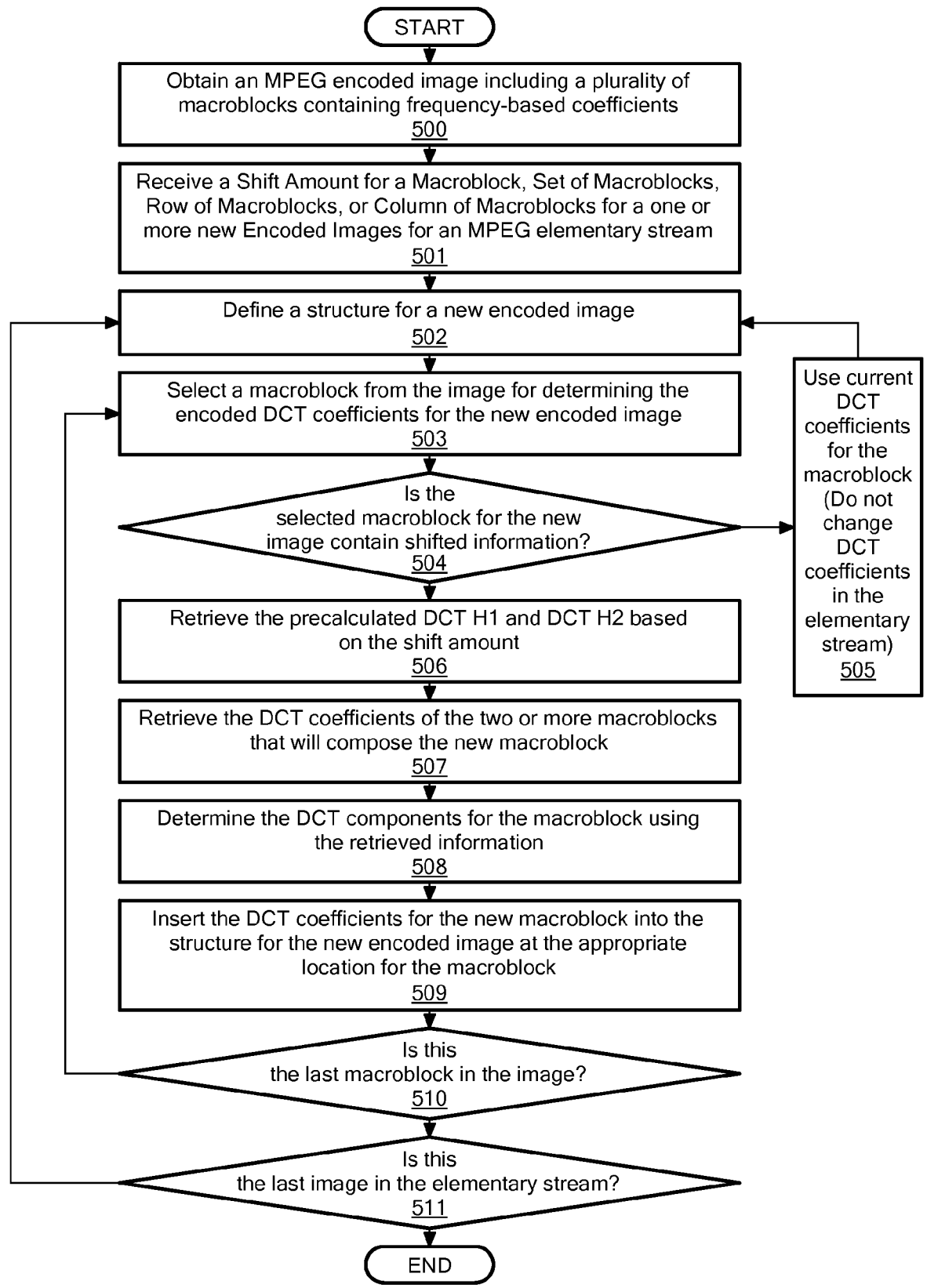
FIG. 5 is a flow chart of the steps taken for creating new blocks for subsequent image frames wherein the blocks move by a number of pixels for each unit of time.

The flow chart of FIG. 5 shows the process for creating an MPEG encoded elementary stream starting with an encoded video still image. The new elementary stream results from new content being added to the encoded still image in a subsequently displayed image. When the new content is added, it causes a block from the still image to be shifted by a number of pixels. The shifting of one block creates a domino effect wherein other blocks are also shifted by the same number of pixels. For example, if a developer wants a graphical element composed of a number of pixels to move by a set number of pixels between frames, a computer program operating on a processor calculates the DCT coefficients or the DCT coefficients and motion vectors for all subsequent images within the MPEG elementary stream in which macroblocks are translated.

In one embodiment, the methodology may be embodied as a processor running computer executable code wherein the computer executable code may be stored in memory either on or off processor. The processor first obtains an MPEG encoded still image or MPEG encoded elementary stream 500. If the processor receives an MPEG encoded elementary stream, the processor will select a single MPEG encoded image from the stream. The MPEG encoded image is encoded as an I-frame as is understood by one of ordinary skill in the art. In alternative embodiments, another frame type (e.g. B or P) may be selected and converted into an intracoded frame.

Each macroblock of the MPEG encoded image includes DCT-encoded coefficient values. A shift amount is received by the processor 501. The shift amount or rate of shift may be predetermined or input by a developer. The number of encoded images to be created is either predetermined, input or determined by the processor. The number of encoded images may be determined by a period of time for movement of the macroblocks. The developer determines the macroblock, row(s), column(s) or object that will be moved along with the number of pixels by which the object is to be moved in a subsequent image or sequence of images. Thus, one or more macroblocks may move between frames along a path defined by a coordinate system. The coordinate system may be an x-y coordinate system and the path can be a linear path or a path defined by a function. The function may include both properties of space within the coordinate system and time. The processor determines the macroblocks in the new video frame(s) that will include data from two or more macroblocks from the MPEG encoded still image along with new encoded material. This process may require calculating the path for the macroblocks that are to be repositioned. Additionally, the path may determine the number of new MPEG encoded images to create. For example, if a macroblock is to traverse a display from left to right, the display rate is 30 frames per second, the macroblock is moving at 4 pixels per frame and the frame is 480 pixels wide, the processor would create 120 MPEG encoded images and the macroblock would take 4 seconds to traverse the screen. The processor then defines a structure for a new encoded image. 502 The structure may include MPEG header information for: an elementary stream, an image, a macroblock and a block along with other MPEG header information.

The encoded still image along with the new encoded information is then processed in order to create the one or more subsequent video frames. A first macroblock is selected from the still image 503. The processor determines if the data within the macroblock in the new image will be composed of macroblock data from two or more macroblocks from the original still image or new material 504. If the answer is "no", the current DCT coefficients for the macroblock are used 505. Thus, this data is used to construct the macroblock for the new MPEG encoded image. The encoded coefficients for the macroblock are inserted into the structure for the new MPEG encoded image. In the alternative, the motion vector denoting zero motion may be inserted into the structure defining the new MPEG encoded image. If the new macroblock is composed of encoded data from two or more macroblocks from the original still image or new content, the precalculated identity matrix DCT values are retrieved based upon the shift amounts. 506 The DCT coefficients of the two or more macroblocks that will compose the new macroblock are next retrieved. 507 The processor then determines the DCT coefficients for each block of the new macroblock by applying the formula $$\sum_{i=1}^{2} DCT(B_i)DCT(H_i)$$

or $$\sum_{i=1}^{2} DCT(D_i)DCT(H_i)$$

as expressed above if the new macroblock is simply composed of two other macroblocks shifted in the horizontal or vertical directions, and $$\sum_{i=1}^{4} DCT(H_{i1})DCT(B_i)DCT(H_{i2})$$

for more than two macroblocks. 508. Other equations for non-linear movement as provided below may be used and as explained with respect to FIG. 6a. In other embodiments of the invention, the processor use the above equations only with macroblocks that contain newly introduced content that is not present in a previous frame. Motion vectors can be determined for all macroblocks that do not have newly introduced content. For example, if new content is traversing the screen from right to left, and new content is only introduced in a single macroblock at the far right of the screen, only this macroblock would need to employ the above equations to calculate out the coefficient values for each of the blocks. The remaining macroblocks could be replaced with motion vectors in frames subsequent to the initial still image.

The determined coefficients are then inserted into the proper position within the structure defining the encoded MPEG image. 509 The MPEG image structure is defined by the MPEG specification. The processor then checks to see if this is the last macroblock for the image. 510 If it is not, the process continues wherein the next macroblock for the new image is selected. Once all of the macroblocks for the new image have been determined, the processor will determine whether all images have been determined for the sequence of movement of the macroblock(s) or object. 511. If the answer is yes, the process will end, if the answer is no, the process will continue with creation of the next encoded MPEG image for the elementary stream.

Figure 6A:
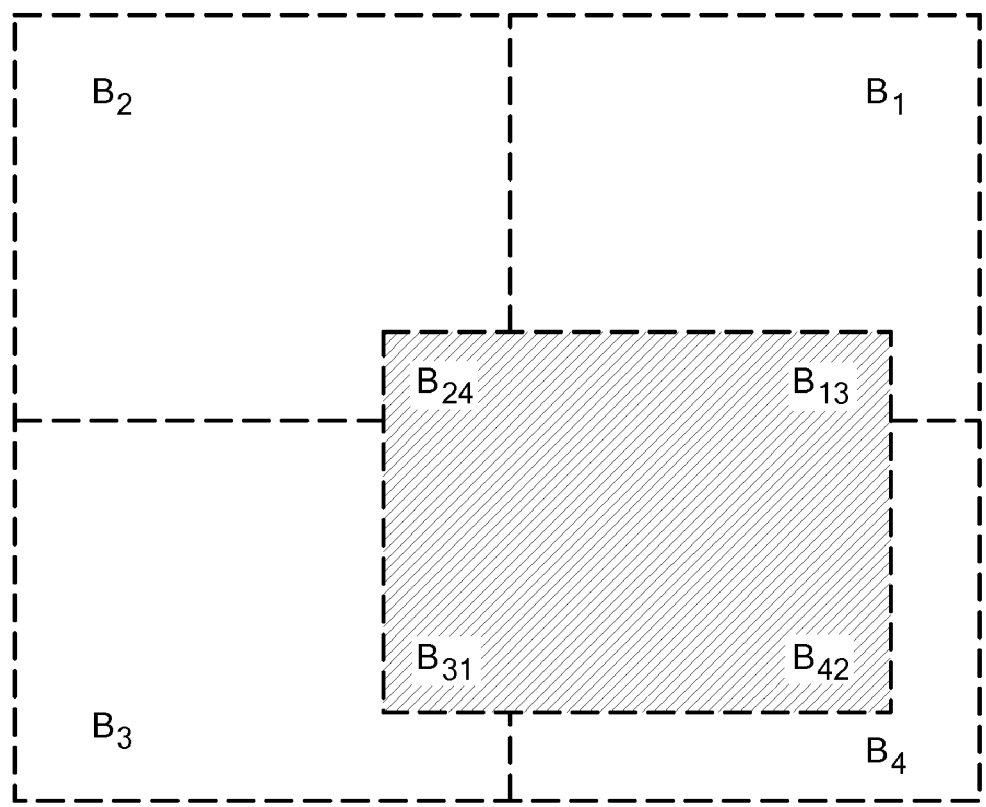
FIG. 6A shows a block B' that is created from four other blocks from the combination of encoded macroblocks as represented in the spatial domain.

FIG. 6A shows a block B' that is created from four other blocks from the combination of encoded macroblocks (e.g. blocks from an MPEG encoded still image and new encoded content) as represented in the spatial domain. As shown, the box that contains $B_{24}$, $B_{13}$, $B_{31}$, and $B_{42}$ defines block B' within the new MPEG encoded image. This new block is formed from four other blocks $B_1, B_2, B_3$, and $B_4$. The equations to be used by the processor are provided below for determining the new block encoded coefficient values in the encoded domain.

$$B' = B_{13} + B_{24} + B_{31} + B_{42}$$

$$DCT(B') = DCT(B_{13}) + DCT(B_{24}) + DCT(B_{31}) + DCT(B_{42})$$

$$B_{42} = H_1 B_4 H_2, \text{ where } H_1 = \begin{bmatrix} 0 & 0 \\ I_h & 0 \end{bmatrix}, H_2 = \begin{bmatrix} 0 & I_w \\ 0 & 0 \end{bmatrix}$$

where $I_h$ and $I_w$ are identity matrices with size h×h and w×w $$DCT(B_{42}) = DCT(H_1)DCT(B_4)DCT(H_2)$$

$$DCT(B') = \sum_{i=0}^{4} DCT(H_{i1})DCT(B_i)DCT(H_{i2})$$

Figure 6B:
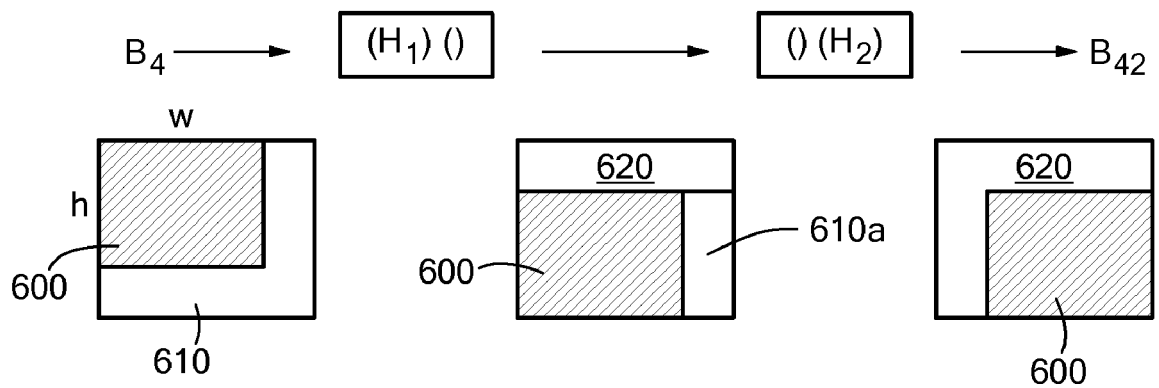
FIG. 6B graphically shows, as represented in the spatial domain, the transformation of the spatial data of B4 in order to obtain $B_{42}$.

FIG. 6B graphically shows, as represented in the spatial domain, the transformation of the spatial data of B4 in order to obtain $B_{42}$. It should be clearly noted that this is a spatial representation of the transformation and not a representation of the actual coefficient data as it is transformed in the encoded domain. As shown, the spatial data for block $B_4$ that is used to form the new block includes the upper left quadrant 600 of the block such that an L shape 610 of the unused spatial data from $B_4$ is formed around the used spatial data 600. The spatial data of $B_4$ is shifted down by the appropriate number of pixel values as required. As shown in the graphic, the spatial data (used and unused) are shifted vertically, such that the data that defines $B_{42}$ is in the proper vertical position and no data exists above the spatial data as represented by the empty rectangle 620. However, some unnecessary data 610a exists to the right of the spatial data that defines $B_{42}$ that has not been removed from the processed block $B_4$. The vertically shifted data (600, 610a) is horizontally shifted by the appropriate number of pixel values. Thus, the unnecessary data values 610a are removed and the resulting block includes only the spatial data 600 for $B_{42}$. As a result, the spatial data has been repositioned leaving an L shape 620 without data. Thus, $B_{42}$ has the spatial data 600 used from $B_4$ shifted both vertically down and horizontally to the right. By processing the data in the encoded domain, the identity matrix multiplications have the same effect as expressed above with respect to the spatial domain.

Figure 7:
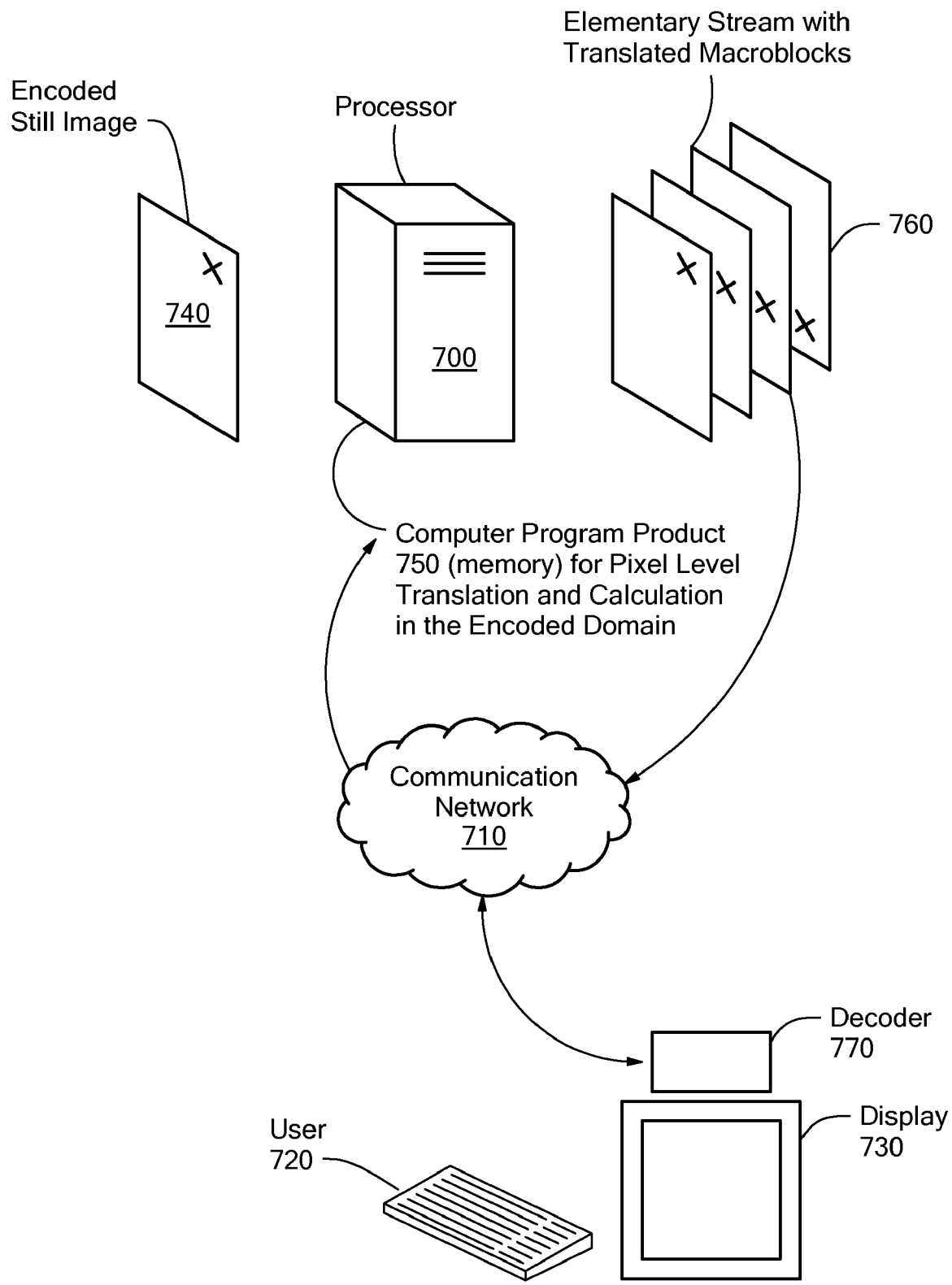
FIG. 7 shows an environment and system for employing the above described methodology.

FIG. 7 shows an environment and system for employing the above described methodology. As shown, a user may interact with a processor 700 that is remotely located through a communication network 710 such as the Internet. In embodiments of the invention, the communication network 710 may be a cable television network, a satellite network, a wireless network, or an IP network. The user may use a user input device 720 to request interactive content from the processor 700 for display on the user's display device 730. The processor 700 either receives or retrieves from memory an encoded still image 740. The processor uses a computer program that is stored in memory 750 to create an elementary stream 760 wherein one or more macroblocks are translated across a series of macroblocks within the elementary stream. The calculations for the newly created images within the elementary stream are performed in the encoded domain without decoding the encoded still image to the spatial domain. The created elementary stream 760 is then output by the processor 700 and forwarded through the communication network 710 to a decoder 770 that is associated with the user's display 730. The decoder 770 may be part of a cell phone, a set-top box, part of a television, or a separate decoder. The elementary stream 760 is decoded by the decoder 770 and the output of the decoder is displayed on the user's display device 730 wherein one or more macroblocks move across the screen.

Applying the above formulas within a computer program, an encoded MPEG elementary stream can be created without the need for decoding the original still encoded image to the spatial domain shifting the data and encoding each frame for an elementary stream. In other embodiments, a developer may begin with an image in the spatial domain and then encode the image and use the above described methodology and system. The encoded elementary stream may then be distributed to one or more end users or placed on a recordable media for later distribution. Preferably, the above system and methodology may be employed in a real-time system, wherein the computational savings result in increased performance and decreased time lag between a request for content that includes moving elements/macroblocks and presentation of the content on a display device associated with the requester.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof.

Computer program logic implementing all or part of the functionality previously described herein may be embodied in various forms, including, but in no way limited to, a source code form, a computer executable form, and various intermediate forms (e.g., forms generated by an assembler, compiler, linker, or locator.) Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies, networking technologies, and internet working technologies. The computer program may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web.)

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL.)

The present invention may be embodied in other specific forms without departing from the true scope of the invention. The described embodiments are to be considered in all respects only as illustrative and not restrictive.

What is claimed is:

1. A computer implemented method for determining encoded block data of a macroblock for a new image in an elementary stream based upon two or more blocks at least one block originating from a still encoded image, the method comprising:
   receiving the still encoded image into a processor;
   obtaining a pixel shift associated with one or more blocks within the still encoded image;
   obtaining encoded block data for the two or more blocks that form a new block in the new image;
   retrieving one or more encoded identity matrixes based upon the pixel shift; and
   calculating the new encoded block data based upon the retrieved one or more identity matrixes and the encoded block data for the two or more blocks.

2. A computer implemented method according to claim 1, wherein each of the two or more blocks that form a new block in the new image originate from either the still encoded image or from new encoded content.

3. A computer implemented method according to claim 1, wherein the two or more blocks that form a new block in the new image each originate from the still encoded image.

4. A computer implemented method according to claim 1, further comprising:
   placing the data into a new encoded image location.

5. A computer implemented method according to claim 4, further comprising:
   creating in memory an elementary stream including at least the still encoded image and the new encoded block data for the new image.

6. A computer implemented method according to claim 1, wherein the encoded data is MPEG encoded.

7. A computer implemented method according to claim 1, further comprising:
   repeating the steps of obtaining encoded block data, retrieving one or more encoded identity matrixes and calculating for each block in the new image that includes shifted block data.

8. A computer implemented method according to claim 7, for each block within the new encoded image that does not contain a shifted block from the still encoded image, inserting the encoded block data from the still encoded image into a corresponding block location in the new encoded image.

9. A non-transitory computer program product for use on a computer system for determining a new encoded block data for a new image comprising two or more blocks from a still video image and new encoded content, the computer program product comprising a computer readable storage medium having computer readable program code thereon, the computer readable program code comprising:
   computer code for receiving the still encoded image;
   computer code for receiving new encoded content;
   computer code for obtaining a pixel shift for a block within the still encoded image;
   computer code for selecting encoded block data for a block location that comprises encoded block data from the still encoded image and the new encoded content;
   computer code for retrieving one or more encoded identity matrixes based upon the pixel shift; and
   computer code for calculating the new encoded block data based upon the retrieved one or more identity matrixes and the encoded block data from the still encoded image and the new encoded content.

10. A non-transitory computer program product according to claim 9, further comprising:
    computer code for placing the new encoded block data into a new encoded image block location.

11. A non-transitory computer program product according to claim 10, further comprising:
    computer code for creating an elementary stream including at least the still encoded image and the new encoded block data for the new image.

12. A non-transitory computer program product according to claim 9, wherein the encoded data is MPEG encoded.

13. A non-transitory computer program product according to claim 9, further comprising:
    computer code for repeating for each block in the new image that includes shifted block data the computer code for obtaining encoded block data, computer code for retrieving one or more encoded identity matrixes and computer code for calculating.

14. A non-transitory computer program product according to claim 13, further comprising:
    computer code for each block within the new encoded image that does not contain a shifted block from the still encoded image that inserts the encoded block data from the still encoded image into a corresponding image location in the new encoded image.

15. A computer-implemented method for determining transform encoded data for a new block representative of a spatial image element of an image to be displayed on a display device, the new block comprising transform encoded data from at least a first and second transform encoded block, wherein a first portion of a spatial image element for the new block resides in the first block and a second portion of the spatial image element for the new block resides in the second block, the method comprising:
    multiplying a first identity matrix by the transform encoded data from the first block forming a first data set wherein the first identity matrix has a dimensional property proportional to the first portion of the spatial image element;
    multiplying a second identity matrix by the transform encoded data from the second block forming a second data set wherein the second identity matrix has a dimensional property proportional to the second portion of the spatial image element;
    using the first and second data sets to form a new transform encoded block data set;
    storing the new transform encoded block data set in a memory.

16. A computer implemented method according to claim 15 further comprising:
    quantizing the new transform encoded block data set;
    entropy encoding the quantized new transform encoded block data set.

17. The computer implemented method according to claim 15, further comprising:
    placing the new transform encoded block data set at a predetermined location within an MPEG frame data set.

18. A non-transitory computer program product for use on a computer system for determining transform encoded data for a new block, the new block comprising transform encoded data from at least a first and second transform encoded block, wherein a first portion of a spatial image element for the new block resides in the first block and a second portion of the spatial image element for the new block resides in the second block" the computer program product comprising a computer readable storage medium having computer readable program code thereon, the computer readable program code comprising:

computer code for multiplying a first identity matrix by the transform encoded data from the first block forming a first data set wherein the first identity matrix has a dimensional property proportional to the first portion of the spatial image element;

computer code for multiplying a second identity matrix by the transform encoded data from the second block forming a second data set wherein the second identity matrix has a dimensional property proportional to the second portion of the spatial image element;

computer code for processing the first and second data sets to form a new transform encoded block data set;

computer code storing the new transform encoded block data set in a memory.

19. A non-transitory computer program product according to claim 18 further comprising:

computer code for quantizing the new transform encoded block data set;

entropy encoding the quantized new transform encoded block data set.

20. The non-transitory computer program product according to claim 19, further comprising:

computer code for placing the new transform encoded block data set at a predetermined location within an MPEG frame data set.

* * * * *